March 31, 1942.     S. J. OLSON     2,278,184
PUNCH
Filed July 1, 1939     3 Sheets-Sheet 1
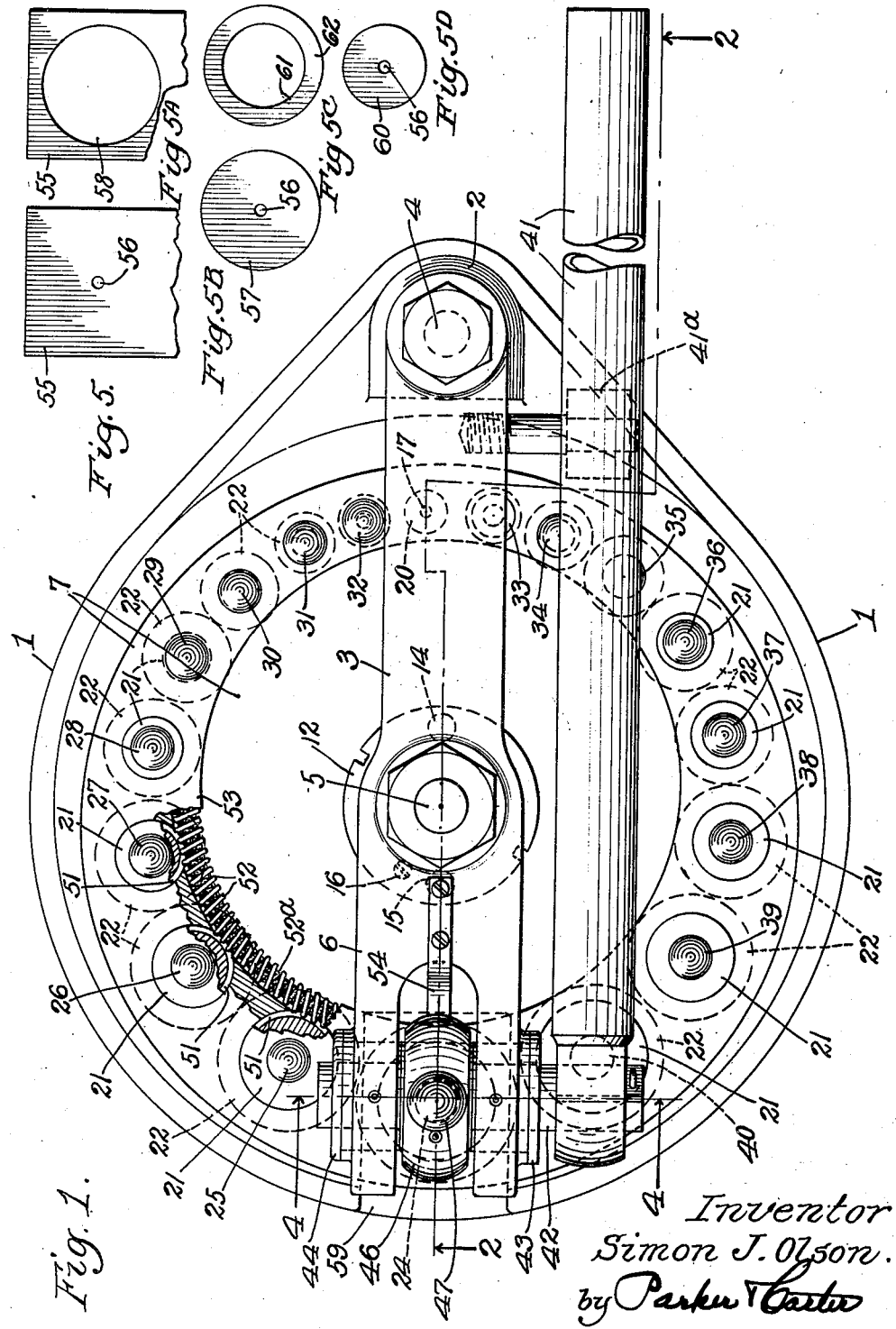
Inventor.
Simon J. Olson.
by Parker & Carter
Attorneys.

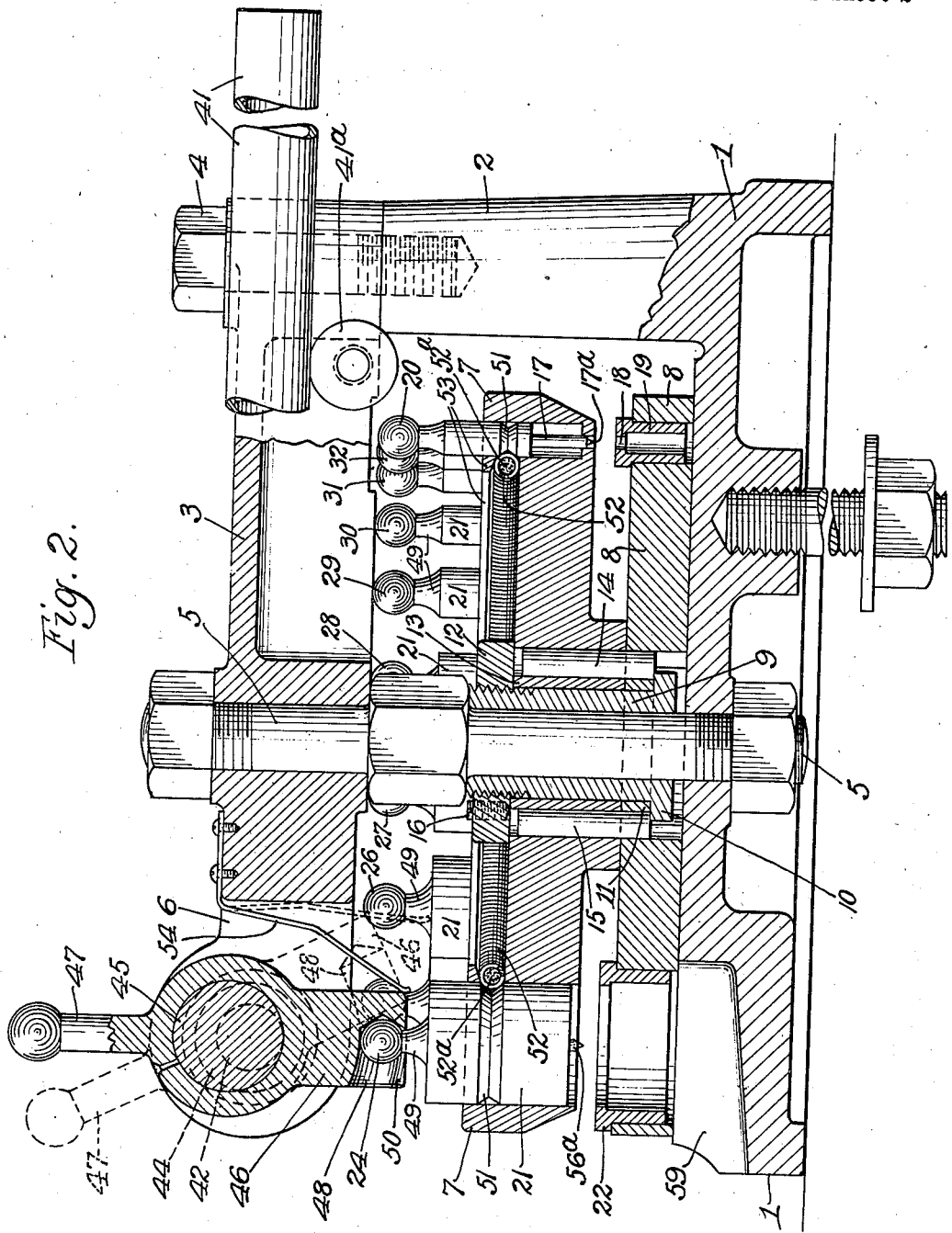

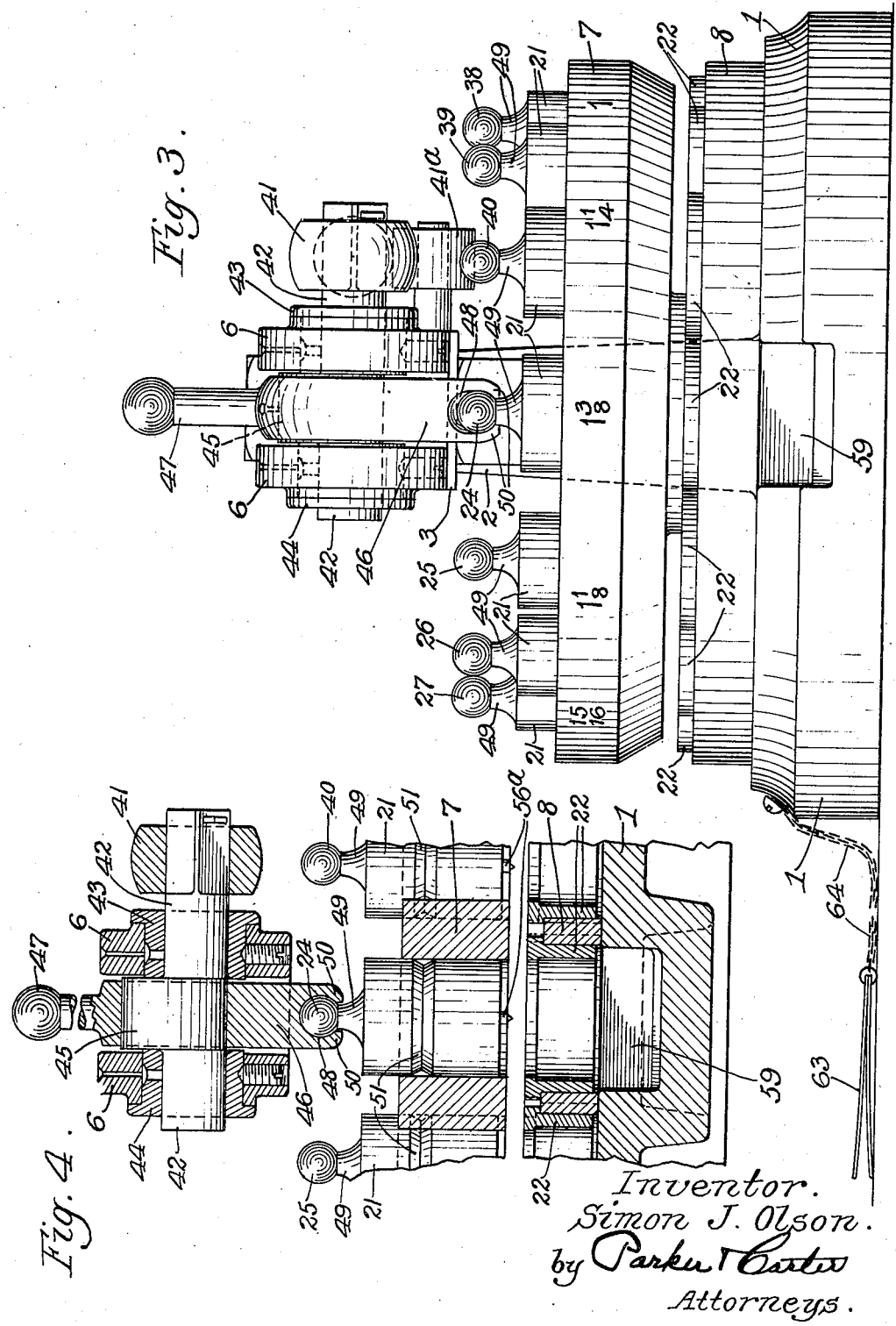

Patented Mar. 31, 1942

2,278,184

UNITED STATES PATENT OFFICE 2,278,184

PUNCH

Simon J. Olson, Rockford, Ill.

Application July 1, 1939, Serial No. 282,380

12 Claims. (Cl. 164—96)

This invention relates to punches and has for its object to provide a new and improved device of this description.

The invention has as a further object to provide a punch particularly adapted for punching washers and gaskets. The invention has as a further object to provide a device by means of which washers or gaskets of a large variety of sizes can be easily and quickly made. The invention has as a further object to provide a punch having a series of dies of different diameters, mounted eccentrically on a plate which is rotated to bring any one of the dies to an operating position. The invention has as a further object to provide a punch having a centering device for centering the washers and means for punching washers of a great variety of sizes from the same centering device, the centering device and the dies for the washers being mounted upon the same movable part.

The invention has other objects which are more particularly pointed out in the accompanying description.

Referring now to the drawings,

Fig. 1 is a plan view of one form of device embodying the invention;

Fig. 2 is a sectional view taken on line 2—2 of Fig. 1;

Fig. 3 is a front elevation of the device shown in Fig. 1, with parts of the reciprocating die members omitted for clearness;

Fig. 4 is a sectional view taken on line 4—4 of Fig. 1; and

Fig. 5 is a view of a portion of a blank after the first step punching a hole has been made;

Fig. 5A shows the same blank after the washer blank has been cut out;

Fig. 5B is a view of this washer blank;

Fig. 5C is a view of the washer formed by cutting out the center part;

Fig. 5D is a view of the center part ready to be used to cut out another washer.

Like numerals refer to like parts throughout the several figures.

The device can be used in any place desired by being mounted upon any suitable support, such as a bench. It consists of a base 1 having the upstanding member 2. There is a cross member 3 attached to the upstanding member 2 in any desired manner, as by means of the bolt 4. There is a central member 5 which is connected with the base 1 and with the cross member 3, the cross member therefore being supported by the upstanding member 2 and the central member 3 and having a cantilevered end 6.

Rotatably mounted upon the central member 5 is a die holding device, which as herein shown consists of the two members 7 and 8, connected so as to rotate together. As herein shown, there is a sleeve 9 on the central member which passes through openings in the die holding members 7 and 8 and which has a flange 10 at one end which engages a part 11 of the member 8, see Fig. 2. There is a nut 12 at the other end threaded onto the sleeve 9, which engages a part 13 of the member 7. When this nut is tightened it clamps the two members 7 and 8 together. The two members 7 and 8 are connected so as to rotate together by means of the pins 14 and 15 which pass through openings in both members and which at their lower ends engage the flange 10 of the sleeve 9. A set screw 16 extending through the nut 12 engages the member 7 and locks the nut in position.

Associated with the die holding members is a centering punch for punching a centering hole through the washer. This punch consists of the reciprocating member 17 on the die holding member 7, which is preferably provided with the sharp point 17a and which cooperates with an opening 18 on the die holding member 8. There is preferably a member 19 separate from the member 8 and which is provided with the opening 18. Connected with the punch member 17 is an engaging member 20 with which the actuating devices engage Connected with the die holding members 7 and 8 are a series of die elements varying in size for the purpose of producing washers or gaskets of different sizes. These die elements consist of a series of reciprocating die members 21 on the die holding member 7 and a series of stationary die members 22 on the die holding member 8. The sheet from which the washers are made is placed in between the reciprocating die member 21 and the stationary die member 22 and then the reciprocating die member 21 is moved downwardly so as to cut out the washer from the sheet. The stationary die members 22 are preferably made separate from the die holding member 8 and placed therein as shown.

The die elements are of different sizes. Any desired number of these die elements may be provided. As herein shown there are seventeen of them, varying in sizes ranging from the smallest washers desired to the largest washers desired. With eighteen of these die elements ranging, for example, from one-eighth of an inch to one and three-eighths of an inch, including the one punch, I am enabled to produce one hundred and fifty washer sizes. The reciprocating die members are eccentrically mounted on the die holding member 7 and the die holding member 7 is eccentrically mounted in position.

The reciprocating die members are provided with engaging members 24, 25, 26, 27, 28, 29, 30, 31, 32, 33, 34, 35, 36, 37, 38, 39 and 40. These engaging members of the reciprocating die members are engaged by the actuating device which reciprocates them. As herein shown, the actuating device comprises a handle 41 connected with a shaft 42, see Figs. 1 to 4. There is a stop 41a which is engaged by the handle and which limits its downward movement. This stop is preferably made of rubber. The shaft 42 is mounted in bearings 43 and 44 on the cross member 3. The shaft 42 is provided with an eccentric 45. Rockably supported upon this eccentric is an actuating member 46 which is provided with a handle 47. This actuating member has a receiving space or notch 48 into which any one of the engaging members of the die members or the punch member is received when it is desired to actuate the die members or the punch member. Fig. 3 shows the engaging member 24 of the die member 21 in this receiving space or notch when the parts are in their operative position. To actuate the die member 21 it is only necessary to move the handle 41 and this rocks the shaft 42 and eccentric 45, thereby causing the die member to move down and in cooperation with the die member 22, cutting the washer from the blank or sheet. The connection between the actuating device and the punch member or die member is such that the punch member or die member will not only be moved down, but will be positively pulled up again to its initial position, by moving the handle. Any suitable means for this purpose may be utilized. As herein shown, this is accomplished by having the engaging members provided with an enlarged end and a small neck portion 49. The receiving space or notch is arranged so that it receives the enlarged end of the engaging member and is provided with the inwardly bent edges 50 which engage the enlarged end so as to hold it and move the die member up when the actuating member is moved up, see Fig. 4. Some means is provided for holding the punch member and the die members up in their initial positions. As herein shown, this is accomplished by providing the punch member and each die member with a groove 51, which preferably extends all the way around, and then providing a spring which enters this groove and holds the punch member and each die member is in its initial position. I have shown a single spring for this purpose, which consists of the coiled spring 52 which extends around the die holding member 7 and is located below a shoulder or flange 53 thereon, see Fig. 2. The coiled spring also projects into the grooves 51 of the punch member and all of the die members, so as to hold them in their initial position. When pressure is applied to any one of these members, the spring gives or moves out of the groove 51 so as to permit it to be moved downwardly, to punch out the washer, and when the handle 41 is moved to move the member back to its initial position, the spring then enters the groove and holds it in this initial position.

If a washer of a different size is desired, the actuating member 46 is moved to release the engaging member on the die member, as shown, for example, in dotted lines in Fig. 2, whereupon the die holding members 7 and 8 may be rotated to bring the punch member or any one of the die members in position so that its engaging member can be brought into the receiving space or notch 48 and thereupon be moved to cut the washer.

I prefer to provide means for normally holding the actuating member 46 in its operative position in engagement with the engaging member on the punch member or one of the die members, as shown, for example, by providing a spring 54 attached to the cross member 3 which engages the actuating member, see Fig. 2.

In Fig. 5 there is illustrated a portion of a blank or sheet 55. The first step consists in actuating the punch so as to make the punch hole 56. The die holding members 7 and 8 are then moved around to the desired size die member and the blank or sheet 55 placed in position under this die member. Each of the die members is provided with a centering projection 56a. This centering projection is then brought into the centering opening 56 and the die member is then actuated to cut out the washer blank 57, (Fig. 5B) leaving the opening 58. This washer blank then drops into the receiving chamber 59. The die holding members 7 and 8 are then moved to bring a die member of a smaller size into the operative position and this die member is then actuated to cut out the center 60, (Fig. 5D) which constitutes another washer blank, leaving the opening 61 with the peripheral part 62, thereby forming the complete washer (Fig. 5C). Another washer of a smaller size can be cut out of the washer blank 60 and the center cut out from this, and this process can be completed until the smallest size washer is made.

The sizes of the different die members are placed on the periphery of the die holding member 7, as shown, for example, in Fig. 3. Some means is provided for inserting and holding the washer blanks, like the washer blank 57, in position under the die member so as to prevent injury to the operator. For this purpose I have shown a pair of tweezers 63 which may be attached to the base 1 by a flexible attaching device 64.

I prefer to provide some means for oiling the reciprocating punch members. In the construction shown this result is secured by providing the coiled spring 52 with oil holding material 52a, such as a wick, saturated with oil. In order to supply oil, it is only necessary to apply oil to the spring and it passes between the coils and saturates the oil holding material.

The use and operation of my invention are as follows.

When the parts are assembled as shown in the drawings and it is desired to cut out a washer of any given size, the die holding members 7 and 8 are then moved to bring the punch member and its engaging member 20 in proper position to be engaged by the actuating member 46. The actuating member is then moved into engagement with the engaging member 20 of the punch member and the blank or sheet is then inserted in the space between the die holding members and under the punch member. The handle 41 is then moved down and this moves the punch member down so as to punch the centering hole 56 in the blank or sheet. The handle 41 is then moved back to its initial position and the actuating device 46 released from the punch member. The die holding members are then moved around to bring the reciprocating die member of the desired size in proper relation to the actuating member 46 and the actuating member 46 is then brought into engagement with its engaging member. The blank or sheet is then inserted under the die member and the centering projection 56a on the die member is brought into the centering opening 56. The die member is then moved down so as to cut out the washer blank, as shown, for example at 57, which washer blank falls into the receptacle 59. The handle is then moved back to its initial position to move the die member back to its initial position and the actuating member 46 is released from the die member. The die holding members 7 and 8 are then moved around to bring the proper die member of smaller diameter in proper relation with the actuating member 46, and the actuating member 46 is then connected with this die member. The washer blank 57 is then held between the tweezers 63 and placed in position under the die member and the centering projection 56a is brought into the opening 56 and the die member is moved down to cut out the washer blank 60 and provide the washer with the central opening 61 and the peripheral part 62, and this process is repeated as desired.

It will thus be seen that any desired size of washer or gasket can be easily and quickly made by means of this device. The device is capable of cutting washers or gaskets out of any of the material used for this purpose, except metal, although it could cut washers out of soft metal.

It will be noted that the two die holding members have a space between them for the insertion of the part from which the washers are to be stamped. When the washer blank is cut out, it is placed in this space opposite the cooperating die members and the reciprocating die member is moved down to finish the washer. I have found it exceedingly difficult to properly center this washer blank. This difficulty was entirely removed by the centering device herein shown and which has been called the centering punch, consisting of the members 17 and 19. By means of this centering device, the centering opening is made in the washer blank and then when this washer blank is placed in the receiving space between the die holding members and moved up, the centering projection 56a on the die member passes into this centering opening, thus positively and accurately assuring the proper centering of the washer blank, so that when the reciprocating die member is moved downwardly, the hole cut through the washer will be central thereof so that the peripheral part 62 of the washer is of equal width throughout its entire circumference.

The oiling device for the reciprocating die members keeps them properly oiled so that they not only work properly, but are prevented from rusting. It will be noted that each of the reciprocating die members is provided with an elastic holding device which engages its periphery. This elastic holding device is herein illustrated as a coiled spring. This spring acts not only to hold the members but acts also as an oiling means for supplying them with oil. It is of course evident that there may be individual elastic holding devices, such as individual springs, for each of the die members or for each pair of die members, of any desired kind that will hold them in their initial position and yet permit them to be moved down to punch the sheet of material.

I claim:

1. A punch comprising a base, a plurality of vertically reciprocating die members of varying sizes, a die holding member therefore, a plurality of cooperating die members, a die holding member therefor, a vertically movable actuating device for said vertically reciprocating die members, said die holding members being rotatably mounted in a horizontal plane, so that any of said die members can be brought in proximity to said actuating device, said vertically movable actuating device comprising a member which engages one of said vertically reciprocating die members and which locks the die holding member from swinging in a horizontal plane and simultaneously locks the vertically reciprocating die to the vertically movable actuating device.

2. A punch comprising a base, a plurality of vertically reciprocating die members of varying sizes, a holding member therefor, a plurality of cooperating die members, a holding member therefor, a vertically movable actuating device for said vertically reciprocating die members, said holding members being rotatably mounted in a horizontal plane, so that any of said die members can be brought into proximity to said actuating device, said vertically movable actuating device comprising a member which engages one of said vertically reciprocating die members and which simultaneously locks the die holding member from swinging in a horizontal plane and locks the vertically reciprocating die member to the vertically actuating member, said vertically movable actuating device having a rotatable eccentric forming a part thereof.

3. A punch comprising a base, a plurality of vertically reciprocating die members of varying sizes, a die holding member therefor, a plurality of cooperating die members, a die holding member therefor, a vertically reciprocating punch member on the die holding member carrying the reciprocating die members, a cooperating punch member on the other die holding member, a vertically movable actuating device for said reciprocating punch and die members, said die and punch holding members being rotatable in a horizontal plane, so that the punch or any of said die members can be brought in proximity to said actuating device, said vertically movable actuating device comprising a member which engages said vertically reciprocating punch and which locks the punch holding member from swinging in a horizontal plane and simultaneously locks the vertically reciprocating punch to the vertically movable actuating device.

4. A punch comprising a base, a plurality of vertically reciprocating die members of varying sizes, a holding member therefor rotatable in a horizontal plane, a plurality of cooperating die members, a holding member therefor, an upstanding member connected with said base at one side thereof, a centrally located upstanding member, said holding members being rotatably mounted upon the central upstanding member, a cross member connected with said two upstanding members, a shaft on said cross member, an eccentric on said shaft, a vertically movable actuating device for said vertically reciprocating die members having an eccentric opening into which said eccentric is received, said vertically movable actuating device comprising a member which engages one of said vertically reciprocating die members and which locks the die holding member from swinging in a horizontal plane and simultaneously locks the vertically reciprocating die to the vertically movable actuating device.

5. A punch comprising a base, a plurality of reciprocating die members of varying sizes, a holding member therefor upon which said members are eccentrically mounted, a plurality of cooperating die members, a holding member therefor upon which said cooperating die members are eccentrically mounted, said die members being rotatably mounted upon said base, an upstanding member connected with said base at one side thereof, a centrally located upstanding member, said holding members being rotatably mounted upon the central upstanding member, a cross member connected with said two upstanding members, an actuating device for said reciprocating die members, mounted upon said cross member and provided with a die engaging part adapted to be brought into operative engagement with any one of said reciprocating die members, to actuate the same.

6. A punch comprising a base, a plurality of reciprocating die members of varying sizes, a holding member therefor, a plurality of cooperating die members, a holding member therefor, said die members being rotatably mounted upon said base, an upstanding member connected with said base at one side thereof, a centrally located upstanding member, said holding members being rotatably mounted upon the central upstanding member, a cross member connected with said two upstanding members, a shaft mounted on said cross member, an eccentric on said shaft, and an actuating member for the reciprocating die members mounted upon said eccentric, said die actuating member provided with a laterally movable end having a notch therein for receiving any one of said reciprocating die members, when it is moved opposite thereto.

7. A punch comprising a base, a plurality of reciprocating die members varying in diameter, a die holding member therefor having a plurality of holes varying in diameter for receiving said die members, a plurality of cooperating die members, a die holding member therefor having a plurality of holes varying in diameter for receiving said cooperating die members, an actuating device for said reciprocating die members, said die holding members being rotatably mounted on said base, so that any of said die members can be brought in proximity to said actuating device, a centering device connected with said die holding members for centering the part to be punched, and means for connecting said actuating device with any of said reciprocating die members, so as to move said reciprocating die member with relation to its cooperating die member.

8. A punch comprising a base, a plurality of reciprocating die members of varying sizes, a die holding member therefor, a plurality of cooperating die members, a die holding member therefor, an actuating device for said reciprocating die members, said die holding members being rotatably mounted on said base, so that any of said die members can be brought in proximity to said actuating device, means for connecting said actuating device with any of said reciprocating die members, so as to move said reciprocating die member with relation to its cooperating die member, and a coiled spring extending around the reciprocating die holding member and engaging said reciprocating die members to hold them in position.

9. A punch comprising a base, a plurality of reciprocating die members of varying sizes, a die holding member therefor, a plurality of cooperating die members, a die holding member therefor, an actuating device for said reciprocating die members, said die holding members being rotatably mounted on said base, so that any of said die members can be brought in proximity to said actuating device, means for connecting said actuating device with any of said reciprocating die members, so as to move said reciprocating die member with relation to its cooperating die member, a coiled spring extending around the reciprocating die holding member and engaging said reciprocating die members to hold them in position, and oil holding material within said spring, for supplying oil to said reciprocating die members.

10. A punch comprising a base, a plurality of reciprocating die members of varying sizes, a die holding member therefor, a plurality of cooperating die members, a die holding member therefor, an actuating device for said reciprocating die members, said die holding members being rotatably mounted on said base, so that any of said die members can be brought into proximity to said actuating device, and an elastic holding means at one side of said die members which engages the periphery of said reciprocating die members for holding them in their initial position.

11. A punch comprising a base, a plurality of vertically reciprocating die members, a holding member therefor, a plurality of cooperating die members, a holding member therefor, both of said holding members being rotatable in a horizontal plane, a vertically movable actuating device for said vertically reciprocating die members comprising a member which engages a vertically reciprocating die member and which locks the die holding member from swinging in a horizontal plane and simultaneously locks the vertically reciprocating die to the vertically movable actuating device, and means for moving said vertically movable actuating device out of the way of said vertically reciprocating die members so that any one of them may be brought into position to be engaged thereby.

12. A punch for punching washers from washer blanks, comprising a base, a plurality of reciprocating die members, varying in diameter, a die holding member therefor having a plurality of holes varying in diameter for receiving said die members, a plurality of cooperating die members, a die holding member therefor having a plurality of holes varying in diameter for receiving said cooperating die members, an actuating device for said reciprocating die members, said die holding members being rotatably mounted on said base so that any of said die members can be brought into proximity to said actuating device, said die holding members having a washer blank receiving space between them for receiving the washer blank to be punched, and means for centering said washer blank at the time it is being punched.

SIMON J. OLSON.